(12) United States Patent
Attig et al.

(10) Patent No.: US 7,949,007 B1
(45) Date of Patent: *May 24, 2011

(54) METHODS OF CLUSTERING ACTIONS FOR MANIPULATING PACKETS OF A COMMUNICATION PROTOCOL

(75) Inventors: Michael E. Attig, San Jose, CA (US); Gordon J. Brebner, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 417 days.

This patent is subject to a terminal disclaimer.

(21) Appl. No.: 12/186,099

(22) Filed: Aug. 5, 2008

(51) Int. Cl.
*H04L 12/43* (2006.01)

(52) U.S. Cl. .................................... 370/458; 709/223

(58) Field of Classification Search .................. None
See application file for complete search history.

(56) References Cited

U.S. PATENT DOCUMENTS

| 7,804,844 B1* | 9/2010 | Attig et al. ............... 370/458 |
| 2005/0021871 A1 | 1/2005 | Georgiou et al. |
| 2005/0120105 A1* | 6/2005 | Popescu et al. ............ 709/223 |
| 2007/0220232 A1 | 9/2007 | Rhoades et al. |
| 2007/0237146 A1 | 10/2007 | Hadzic et al. |
| 2008/0126523 A1* | 5/2008 | Tantrum et al. ............ 709/223 |
| 2009/0037440 A1* | 2/2009 | Will et al. ................. 707/100 |

OTHER PUBLICATIONS

U.S. Appl. No. 11/818,788, filed Jun. 14, 2007, Attig et al.
U.S. Appl. No. 11/818,811, filed Jun. 14, 2007, Attig et al.
U.S. Appl. No. 11/818,792, filed Jun. 14, 2007, Brebner.
U.S. Appl. No. 11/818,722, filed Jun. 14, 2007, Brebner et al.
Paulin, P.G. et al.; "Force-Directed Scheduling in Automatic Data Path Synthesis"; Proceedings of $24^{th}$ ACM/IEEE Conference on Design Automation (DAC); Copyright 1987 ACM; pp. 195-202.
Soviani, Cristian et al.; "Synthesis of High-Performance Packet Processing Pipelines"; Proceedings of $43^{rd}$ ACM/IEEE Conference on Design Automation; DAC 2006; Jul. 24-28, 2006; Copyright 2006 ACM; pp. 679-682.
Lee, Edward Ashford et al.; "Static Scheduling of Synchronous Data Flow Programs for Digital Signal Processing"; IEEE Trans. on Computers; Jan. 1987; Copyright 1987 IEEE; pp. 24-35.
Xilinx, Inc.; U.S. Appl. No. 12/186,057 by Attig et al.; filed Aug. 8, 2008.
Xilinx, Inc.; U.S. Appl. No. 12/186,078 by Attig et al.; filed Aug. 8, 2008.
Xilinx, Inc.; U.S. Appl. U.S. Appl. No. 12/186,428 by Attig et al.; filed Aug. 8, 2008.

* cited by examiner

*Primary Examiner* — Chirag G Shah
*Assistant Examiner* — Minh-Trang Nguyen
(74) *Attorney, Agent, or Firm* — LeRoy D. Maunu; Lois D. Cartier (57) ABSTRACT

Methods are provided for generating clusters of actions for manipulating the packets of a communication protocol. A declarative description is input specifying a hierarchical tree structure including a leaf module for each action and instance modules. One instance module is a root of the hierarchical tree structure and each module except the root is a child of an instance module. A constraint specification is input of dependent pairs of the actions. A cluster for each leaf module includes the action of the leaf module. For each instance module, one or more clusters are generated that collectively include the actions in each cluster of each child of the instance module. The actions in each cluster of each child are included in the same cluster, and each dependent pair of the actions is not included in a same cluster. A cluster specification is output for the cluster or clusters of the root.

20 Claims, 6 Drawing Sheets

FIG. 6 ns of Clustering Actions for Manipulating Packets of a Communication Protocol

FIELD OF THE INVENTION

The present invention generally relates to packet processors, and more particularly to processing the declarative description of a packet processor.

BACKGROUND

For packet-based communication protocols, packets communicate data and control information between devices via a communication network. Two communicating devices process the packets to transfer the data and control information between the devices. The communication network typically includes intermediate devices that transfer the packets between the two communicating devices, and the intermediate devices also process the packets.

It is difficult and time consuming to specify the packet processing performed by these devices. For example, it is difficult and time consuming to specify the required functionality of the packet processor together with timing characteristics such as throughput and latency. There is a general need to reduce the complexity of designing packet processors.

The present invention may address one or more of the above issues.

SUMMARY

Various embodiments of the invention provide methods of generating clusters of the actions for manipulating the packets of a communication protocol. According to one embodiment, a declarative description of a processor of the packets is input. The declarative description specifies a hierarchical tree structure including modules that includes a leaf module for each action and instance modules. One of the instance modules is a root of the hierarchical tree structure and each of the leaf and instance modules other than the root is a child of an instance module. A constraint specification is input of one or more dependent pairs of the actions. For each leaf module an initial cluster is generated including the action of the leaf module. For each instance module, one or more clusters are generated that collectively include the actions in each cluster of each child of the instance module. For each cluster of each child of the instance module, the actions in the cluster are included in the same cluster for the instance module, and each dependent pair of the actions is not included in a same cluster. A cluster specification is output for the cluster or clusters of the root.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings, in which.

DETAILED DESCRIPTION OF THE DRAWINGS

Figure 1:
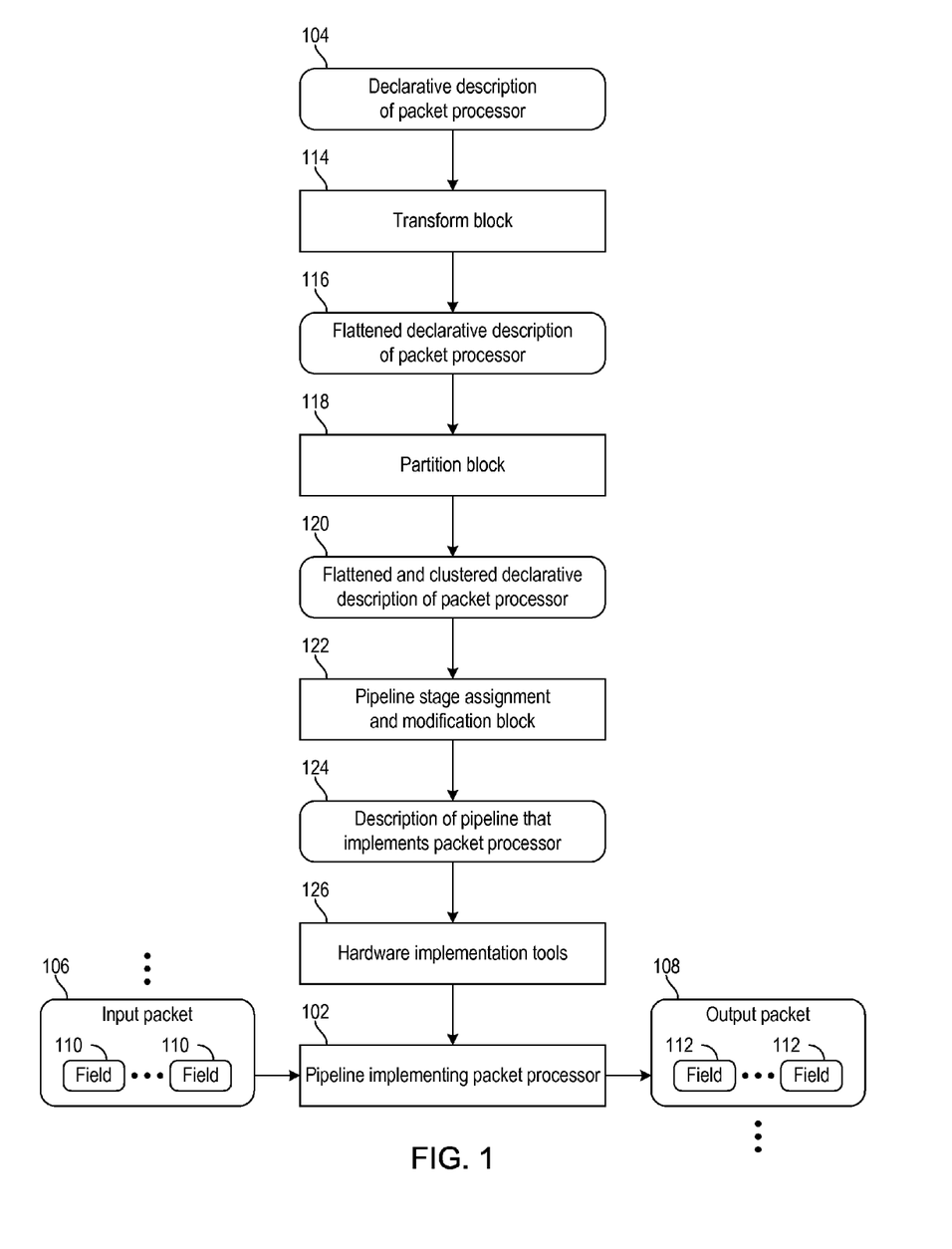
FIG. 1 is a dataflow diagram of a process for implementing and using a packet processor in accordance with various embodiments of the invention.

FIG. 1 is a dataflow diagram of a process for implementing and using a packet processor in accordance with various embodiments of the invention. The process generates a pipeline 102 for the packet processor from a declarative description 104 of the packet processor. The pipeline 102 receives input packets including input packet 106 and produces output packets including output packet 108. The pipeline 102 modifies input packet 106 to produce output packet 108 according to the declarative description 104, including modifying one or more of the fields 110 of the input packet 106 to produce the fields 112 of the output packet 108.

Transform block 114 flattens the rules of the declarative description 104 to produce the flattened declarative description 116 of the packet processor. The declarative description 104 includes sequences of rules for processing the input packets.

Each sequence of declarative description 104 is a sequence of one or more guarded rules. Each guarded rule in each sequence, except possibly a last guarded rule in each sequence, includes a guard condition and an action or another sequence that the guard condition enables and disables. The last guarded rule in each sequence optionally includes a guard condition and generally includes an action or another sequence that the optional guard condition enables and disables. For the first satisfied guard condition, if any, of the guarded rules within each sequence, the action or sequence of the guarded rule with this first satisfied guard condition is enabled, and the actions or sequences of the other guarded rules are disabled. If every guarded rule in a sequence has a guard condition and none of these guard conditions are satisfied, then every guarded rule in the sequence has a disabled action or sequence. If the last guarded rule in a sequence does not have a guard condition and none of the guard conditions of the other guarded rules in the sequence are satisfied, then the action or sequence of the last guarded rule is enabled, and the actions or sequences of the other guarded rules are disabled.

The flattened declarative description 116 includes guarded rules including an action and often including a guard condition for enabling and disabling the action, but the flattened declarative description 116 does not include any sequences of guarded rules. Alternatively, the flattened declarative description 116 is viewed to still include sequences, but each sequence is one guarded rule that is a last guarded rule including an action and an optional guard condition for enabling and disabling the action. Both the declarative description 104 and the flattened declarative description 116 are declarative descriptions of a same packet processor.

Example 1 below is an example of a declarative description of a sequence of two guarded rules and a last guarded rule without its optional guard condition. The guard conditions are included within square brackets and the actions are included within braces. The vertical bars indicate that the guarded rules are not separate guarded rules, but instead form a sequence of guarded rules. The sequence of guarded rules sets a field for the internet protocol address in a packet to an appropriate value based on a value of the version field of the packet.

Example 1

[ver=1]{ip=ip4} | [ver=2]{ip=ip6} | {ip=default}

Example 2 below shows the result of flattening Example 1 into three guarded rules according to various embodiments of the invention. Example 2 includes a corresponding guarded rule for each of the three actions within the sequence of Example 1.

Example 2

[ver=1]{ip=ip4}
[!(ver=1)&&(ver=2)]{ip=ip6}
[!(ver=1)&&!(ver=2)]{ip=default}

Partition block 118 separates the guarded rules of the flattened declarative description into clusters of independent guarded rules of the flattened and clustered declarative description 120 of the packet processor. Two guarded rules are dependent, for example, when one guarded rule defines data required by the other guarded rule. Guarded rules are independent, for example, when they have guard conditions that cannot be satisfied simultaneously. The three guarded rules in Example 2 are independent because their guard conditions are mutually exclusive. All of the guarded rules within each cluster are independent of each other, and any two or more mutually dependent guarded rules are in different clusters.

Stage assignment and modification block 122 orders the clusters of the flattened and clustered declarative description 120, and assigns each cluster to a stage of the pipeline 102 according to the order of the clusters. Block 122 also moves selected actions between stages to simplify the pipeline 102 in one embodiment. Block 122 generates a description 124 of a pipeline 102 that implements the packet processor. In one embodiment, the pipeline description 124 is an HDL description, such as a Verilog or VHDL description, of the pipeline 102.

Implementation tools 126 generate a hardware pipeline 102 implementing the packet processor specified by description 124. In one embodiment, implementation tools 126 generate configuration data for a programmable integrated circuit from an HDL description 124, and the programmable integrated circuit implements the hardware pipeline 102 after loading the configuration data. In another embodiment, implementation tools 126 are ASIC design tools that translate an HDL description 124 into a hardware pipeline 102 within an integrated circuit.

Figure 2:
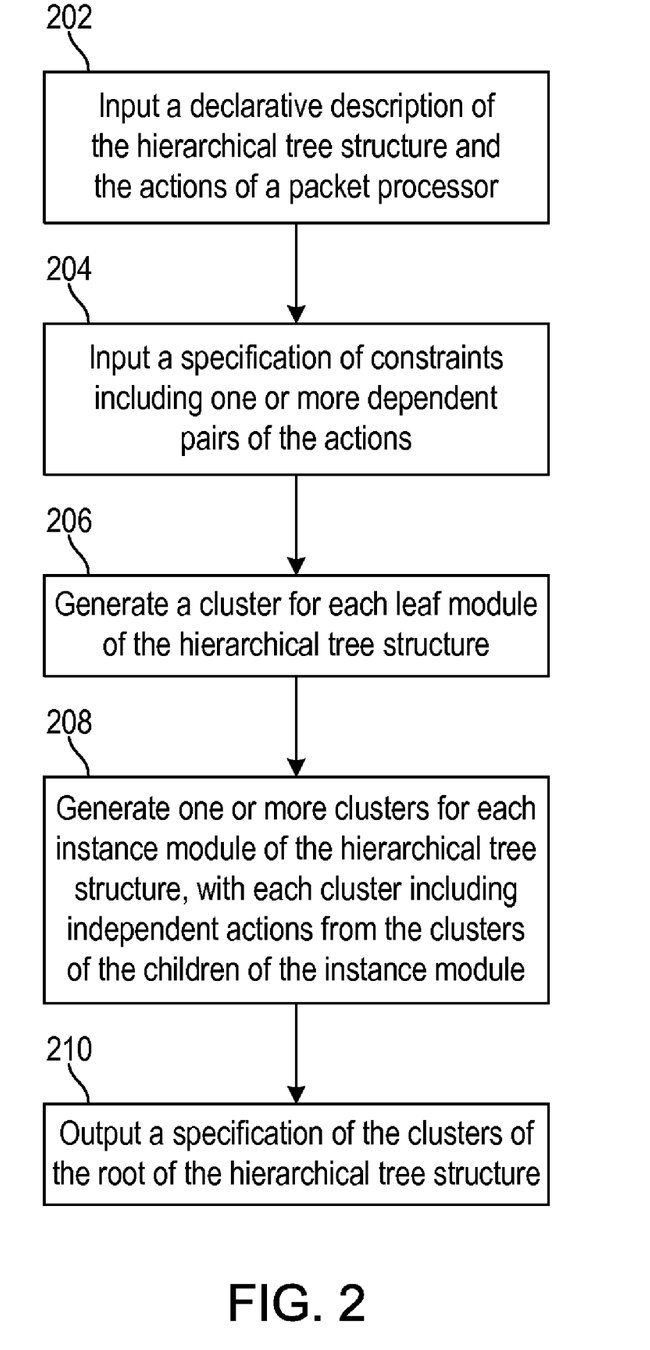
FIG. 2 is a flow diagram of a process for clustering actions for manipulating packets in accordance with various embodiments of the invention.

FIG. 2 is a flow diagram of a process for clustering actions for manipulating packets in accordance with various embodiments of the invention. The actions are grouped into clusters of independent actions. Dependent actions are placed in different clusters.

At step 202, a declarative description of the packet processor is input. The declarative description includes modules in a hierarchical tree structure. The leaf modules of the hierarchical tree structure include the actions for manipulating the packets, with each leaf module including one action. In one embodiment, each action is included in a guarded rule with an optional guard condition of a flattened declarative description.

At step 204, a specification of constraints is input. The constraints include one or more dependent pairs of the actions. In one example, two constraints are dependent because one generates data required by the other, and because the two constraints have guard conditions that can be simultaneously satisfied. In another example, a constraint is input specifying a subset of the actions that require a limited resource.

At step 206, an initial cluster is generated for each leaf module of the hierarchical tree structure, with the initial cluster including the action of the leaf module. At step 208, clusters are generated for each instance module in the hierarchical tree structure from the clusters of the children of the instance module. In one embodiment, the clusters of the children of the instance module are merged to create clusters of independent actions. The merging continues until any further merging would create a cluster including dependent actions.

At step 210, a specification is output of the clusters of the root of the hierarchical tree structure. The clusters of the root include the actions of the declarative description and the actions in each cluster are independent.

Figure 3:
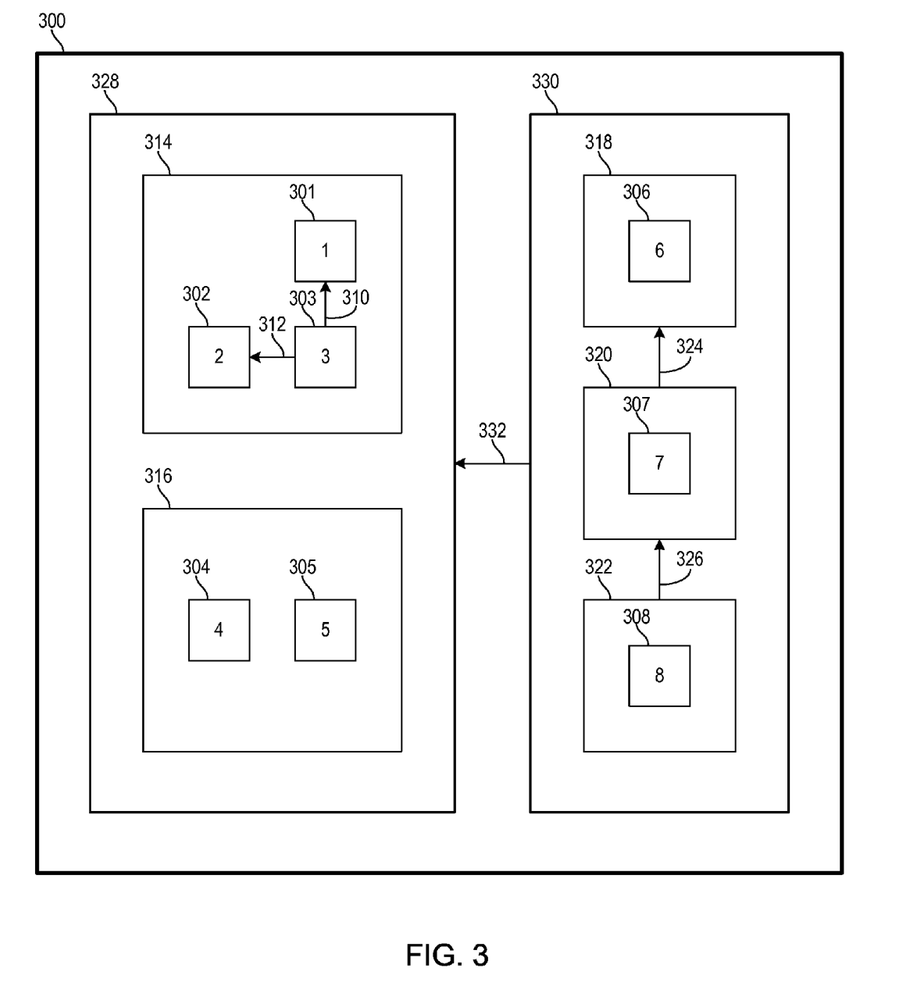
FIG. 3 is a block diagram of an example hierarchical tree structure with dependencies in accordance with various embodiments of the invention.

FIG. 3 is a block diagram of an example hierarchical tree structure with dependencies in accordance with various embodiments of the invention. The hierarchical tree structure has of top-level instance module that is root module 300, and leaf modules 301, 302, 303, 304, 305, 306, 307, and 308 labeled with an identifier of the action included in each leaf module.

The action of leaf module 303 depends on the action of leaf module 301 and the action of leaf module 302. In one example, data dependency 310 exists because the action of leaf module 301 is a variable set action setting a local variable to a function of certain fields of a current packet, and the action of leaf module 303 a memory write action writing a value of this local variable to a location in a memory. In this example, resource dependency 312 exists because the action of leaf module 302 is a memory read action to the same memory as the memory write action of leaf module 303, and the memory is a single port memory permitting a single access at a time. It will be appreciated that dependency 312 is one possible way of preventing concurrent accesses to the single port memory, and resource dependencies can be represented in an alternative manner, such as listing the a subset of the actions requiring a type of resource and listing an available quantity of the type of resource.

In this example, leaf modules 301, 302, and 303 are included in an instance module 314 for a handler that inputs packets, manipulates the packets according to the actions of leaf modules 301, 302, and 303, and outputs modified packets. Similarly, leaf modules 304 and 305 are included in the instance module 316 of a handler, leaf module 306 is included in the instance module 318 of a handler, leaf module 307 is included in the instance module 320 of a handler, and leaf module 308 is included in the instance module 322 of a handler.

In this example, instance module 314 corresponds to a handler for processing one type of packets and instance module 316 corresponds to a handler for processing another type of packets. Instance modules 318, 320, and 322 are linked by dependencies 324 and 326 because the handler of instance module 318 outputs packets that are input by the handler of instance module 320, and the handler of instance module 320 outputs packets that are input by the handler of instance module 322. The handlers are grouped, in this example, according to the services of the layers in a communication protocol stack, with one service corresponding to instance module 328 including instance modules 314 and 316, and another service corresponding to instance module 330 including instance modules 318, 320, and 322. Dependency 332 indicates instance module 328 has a dependency on instance module 330. For example, the service of instance module 328 generates flow control feedback sent to the service of instance module 330. Root module 300 is an instance module corresponding to the communication protocol stack including the services of instance modules 328 and 330.

Figure 4:
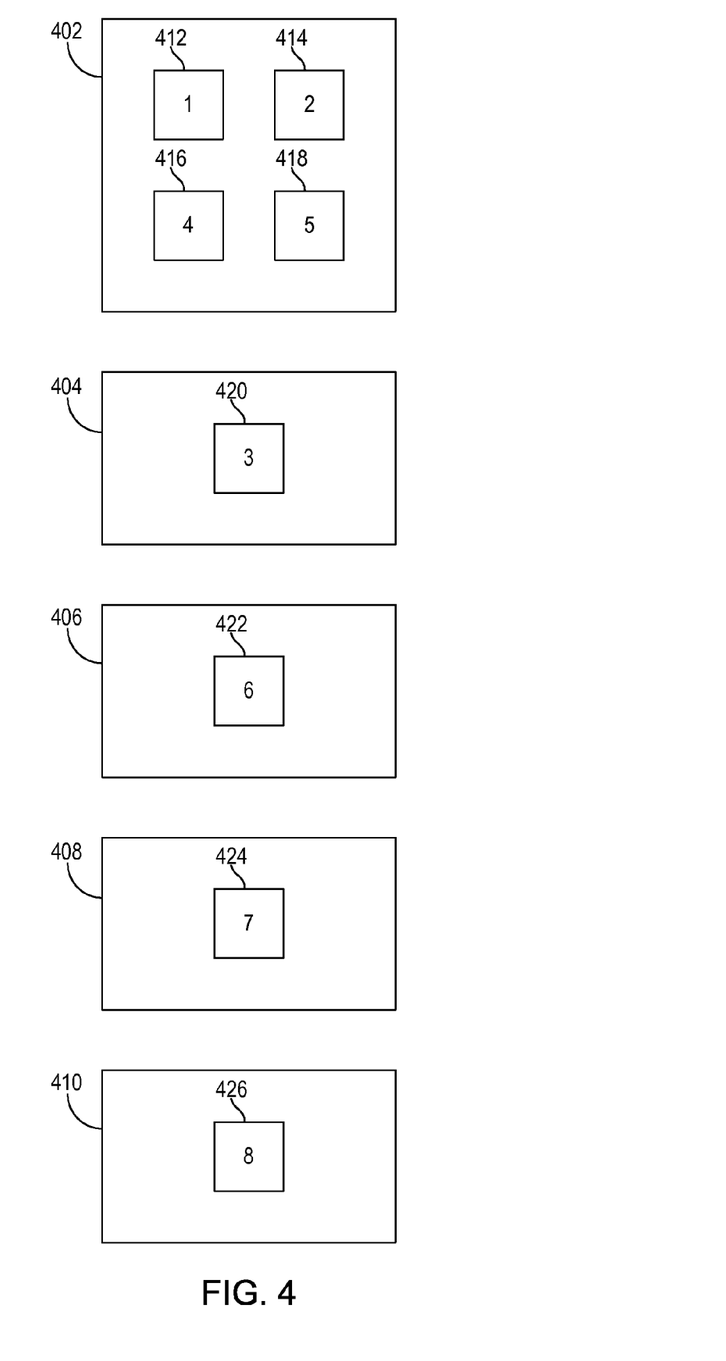
FIG. 4 is a block diagram of an example clustering of the actions of FIG. 3 in accordance with various embodiments of the invention.

FIG. 4 is a block diagram of an example clustering of the actions of FIG. 3 in accordance with various embodiments of the invention. The clusters 402, 404, 406, 408, and 410 each include actions that are independent. The cluster 402 includes the independent actions 412, 414, 416, and 418. The clusters 404, 406, 408, and 410 each include only one action 420, 422, 424, or 426, so the actions in these clusters are trivially independent.

Dependency 310 of FIG. 3 requires that actions 412 and 420 are in different clusters 402 and 404, and dependency 312 requires that actions 414 and 420 are in different clusters 402 and 404. Similarly, dependency 320 requires that actions 422 and 424 are in different clusters 406 and 408, and dependency 322 requires that actions 424 and 426 are in different clusters 408 and 410. Dependency 332 requires that each action 422, 424, or 426 are in different clusters from each action 412, 414, 416, 418, or 420. Thus, all pairs of one of actions 422, 424, or 426 and one of actions 412, 414, 416, 418, or 420 are in different clusters.

After creating initial clusters for each of leaf modules 301, 302, and 303 in FIG. 3, these initial clusters are merged to create the clusters for instance module 314. Because of the dependencies 310 and 312, only the initial clusters for leaf modules 301 and 302 can be merged, and the clusters for instance module 314 become two clusters, one containing the actions 412 and 414, and the other containing the action 420. For instance module 316, the two initial clusters for leaf modules 304 and 305 are merged to create a single cluster containing actions 416 and 418. The three clusters for instance modules 314 and 316 are merged to create the clusters for instance module 328. Because the actions in the single cluster for instance module 316 have no dependencies with the actions in either of the two clusters for instance module 314, the single cluster of instance module 316 could be merged with either one of the two clusters for instance module 314.

FIG. 4 shows one possible result from merging clusters at each instance module in the hierarchical tree structure of FIG. 3. Any further merging of two of clusters 402, 404, 406, 408, and 410 would create a cluster that violates one or more of the dependencies 310, 312, 324, 326, and 332 of FIG. 3.

Figure 5:
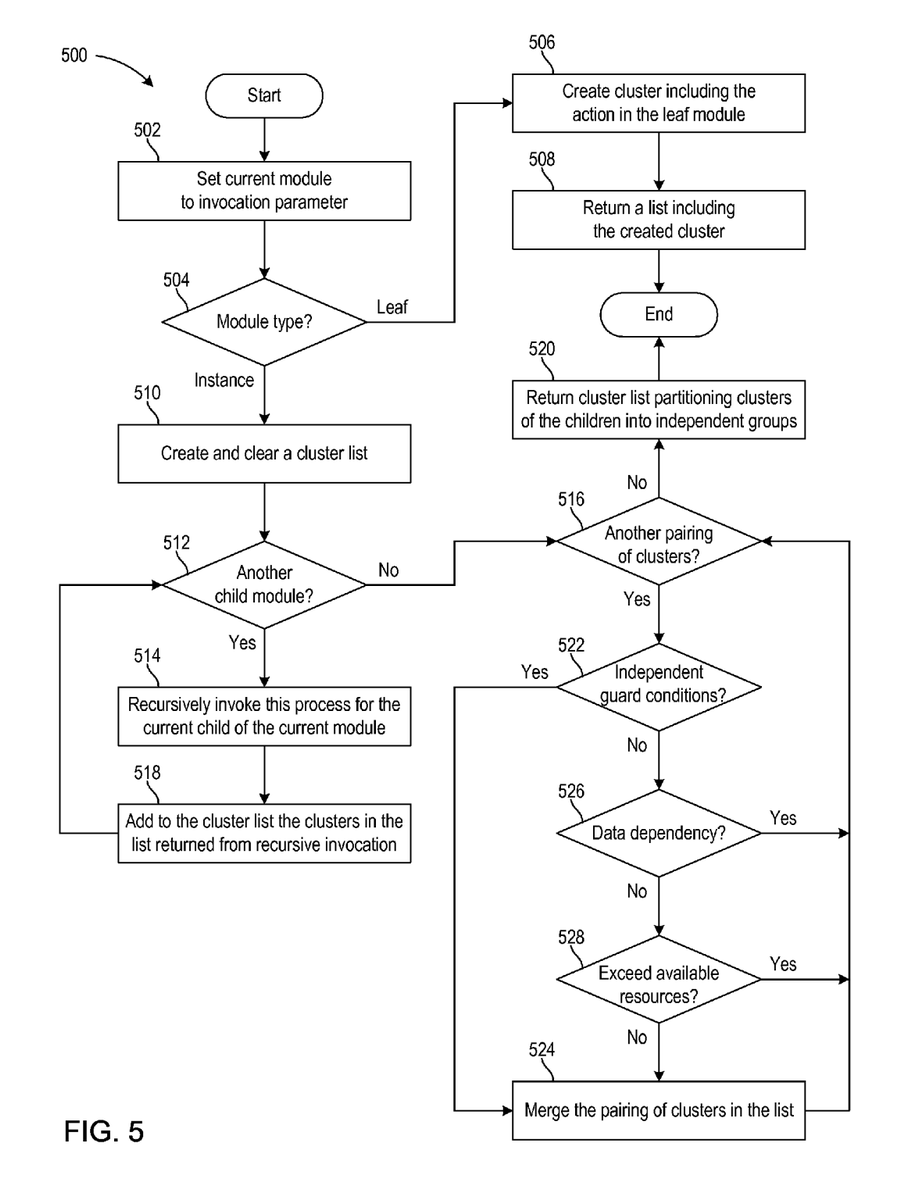
FIG. 5 is a flow diagram of a recursive process for clustering actions for manipulating packets in accordance with various embodiments of the invention.

FIG. 5 is a flow diagram of a recursive process 500 for clustering actions for manipulating packets in accordance with various embodiments of the invention. Process 500 is initially invoked with a parameter of the root module for the hierarchical tree structure. Process 500 is recursively invoked for each additional instance module in the hierarchical tree structure.

At step 502, the current module is set to the invocation parameter that is either the root module for the initial invocation, or another one of the instance modules for a subsequent recursive invocation. Decision 504 checks the type of the current module. If the current module is a leaf module, process 500 proceeds to steps 506 and 508 to create and return a list including a single cluster created to include the action of the leaf module. If the current module is an instance module, process 500 proceeds to step 510.

At step 510, a new empty cluster list is created for the current instance module. Decision 512 checks whether there is another child module of the current instance module. If there is another child module to visit, process 500 proceeds to step 514; otherwise, process 500 proceeds to decision 516. At step 514, process 500 is recursively invoked with an invocation parameter of the current child module, and the recursive invocation returns the cluster list for the current child module. At step 518, the cluster list for the current child module is added to the new cluster list created at step 510. After executing step 518 for the last child module of the current instance module, the new cluster list includes the clusters in the lists for all of the children of the current instance module.

Decision 516 checks whether there is another possible of pairing of the clusters in the new cluster list. If all possible pairings are already considered, process 500 proceeds to step 520 to return the new cluster list, which partitions the children of the current instance module into independent groups of actions. Otherwise, process 500 proceeds to decision 522.

Decision 522 checks whether all the actions in both clusters of the pairing have guard conditions with the guard conditions of one cluster of the pairing independent from the guard conditions of the other cluster of the pairing. If the guard conditions of the two clusters are independent, such that none of the guard conditions of one cluster can be satisfied simultaneously with any of the guard conditions of the other cluster, process 500 proceeds to step 524; otherwise, process 500 proceeds to decision 526.

Decision 526 checks whether there is a data dependency between an action in one cluster of the pairing and an action in the other cluster of the pairing. If there is a dependency, process 500 returns to decision 516; otherwise, process 500 proceeds to decision 528. Decision 528 checks whether merging the actions in the two clusters would violate a constraint on the available resources for implementing the packet processor. In one example, certain actions are memory access actions that access a memory with a limited number of ports, and the resource of the available memory ports would be exceeded by creating a cluster with more of these memory access actions than the number of available memory ports. If merging the pairing of clusters would violate a constraint on available resources, process 500 returns to decision 516; otherwise, process 500 proceeds to step 524.

At step 524, the pairing of clusters is merged. In one embodiment, the merged cluster becomes one of the clusters eligible for additional pairing upon returning to decision 516. Process 500 continues until all pairings are considered at decision 516, or until any additional merging would create a cluster that violates the data and resource dependencies.

Figure 6:
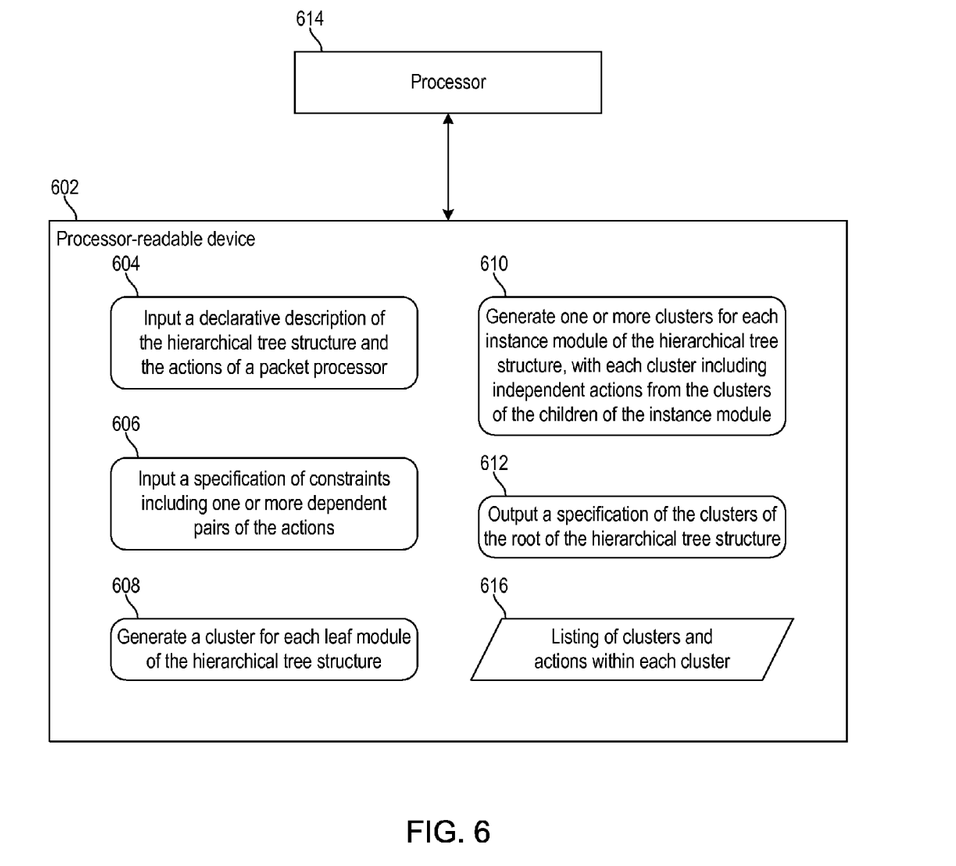
FIG. 6 is a block diagram of a system for clustering actions for manipulating packets in accordance with various embodiments of the invention.

FIG. 6 is a block diagram of a system for clustering actions for manipulating packets in accordance with various embodiments of the invention. Processor-readable device 602 is configured with software modules 604, 606, 608, 610, and 612 for generating a clusters of actions for manipulating packets of a communication protocol.

Execution of the instructions in software module 604 by processor 614 causes processor 614 to input a declarative description of a processor of the packets of the communication protocol. The declarative description specifies a hierarchical tree structure including modules, and the modules include instance modules and respective leaf modules for the actions. One of the instance modules is a root of the hierarchical tree structure and each instance or leaf module other than the root is a child of one of the instance modules.

Execution of the instructions in software module 606 by processor 614 causes processor 614 to input a constraint specification of one or more dependent pairs of the actions.

Execution of the instructions in software module 608 by processor 614 causes processor 614 to generate for each leaf module an initial cluster that includes the action of the leaf module.

Execution of the instructions in software module 610 by processor 614 causes processor 614 to generate for each instance module one or more clusters that collectively includes the actions in the clusters of the children of the instance module. For each cluster of each child of the instance module, the actions in the cluster are included in a same cluster, and each dependent pair of the actions are not included in a same cluster.

Execution of the instructions in software module 612 by processor 614 causes processor 614 to output a cluster specification of the cluster or clusters of the root. In one embodiment, the cluster specification is a listing 616 of clusters and actions in each cluster that is output to a memory, such as processor-readable device 602.

Those skilled in the art will appreciate that various alternative computing arrangements, including one or more processors and a memory arrangement configured with program code, would be suitable for hosting the processes and data structures of the different embodiments of the present invention. In addition, the processes may be provided via a variety of computer-readable storage media or delivery channels such as magnetic or optical disks or tapes, electronic storage devices, or as application services over a network.

The present invention is thought to be applicable to a variety of systems for generating clusters of the actions for manipulating the packets of a communication protocol. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A processor-implemented method of generating a plurality of clusters of a plurality of actions for manipulating a plurality of packets of a communication protocol, comprising:
    inputting a declarative description of a processor of the packets of the communication protocol, the declarative description specifying a hierarchical tree structure including a plurality of modules, the modules including a plurality of respective leaf modules for the actions for manipulating the packets of the communication protocol and a plurality of instance modules;
    wherein one of the instance modules is a root of the hierarchical tree structure and each of the respective leaf and instance modules other than the root is a child of one of the instance modules;
    inputting a constraint-specification of at least one dependent pair of the actions;
    for each respective leaf module, generating a cluster that includes the action of the respective leaf module;
    for each instance module, generating at least one cluster that collectively includes the actions in each cluster of each child of the instance module;
    wherein for each cluster of each child of the instance module, the actions in the cluster are included in a same one of the at least one cluster, and each dependent pair of the actions are not included in a same one of the at least one cluster; and
    outputting a cluster-specification of the at least one cluster of the root.

2. The processor-implemented method of claim 1, wherein the generating of the at least one cluster for each instance module includes selectively merging the clusters of each child of the instance module.

3. The processor-implemented method of claim 2, wherein the at least one cluster of the root comprises a plurality of clusters and every pair of a first and second one of the clusters has a first action in the first cluster and a second action in the second cluster, with the first and second actions being included in a pair from the at least one dependent pair of the constraint-specification.

4. The processor-implemented method of claim 1, wherein the generating of each cluster of each instance and respective leaf module includes performing a traversal of the hierarchical tree structure, upon visiting each respective leaf module the traversal generating the cluster that includes the action of the respective leaf module, and upon visiting each instance module the traversal generating the at least one cluster of the instance module.

5. The processor-implemented method of claim 4, wherein the generating of the at least one cluster upon visiting each instance module includes merging the clusters of each child of the instance module.

6. The processor-implemented method of claim 5, wherein the merging of the clusters of each child of the instance module includes merging at least one independent pair of the clusters of each child of the instance module.

7. The processor-implemented method of claim 5, wherein the merging of the clusters of each child of the instance module includes:
    partitioning the clusters of every child of the instance module into at least one group; and
    for each group, generating a respective one of the at least one cluster including each action of each cluster in the group.

8. The processor-implemented method of claim 7, wherein for each of the at least one dependent pair of the actions, the dependent pair of the actions are not included in the clusters of a same one of the at least one group.

9. The processor-implemented method of claim 1, wherein the at least one cluster of the root comprises a plurality of clusters collectively including the actions for manipulating the packets of the communication protocol.

10. The processor-implemented method of claim 9, wherein for each of the at least one dependant pair of two of the actions, the two actions are in different ones of the clusters of the root.

11. The processor-implemented method of claim 9, wherein:
    the inputting of the constraint-specification includes inputting a constraint specifying a subset of the actions that require a limited resource; and
    each cluster of the root includes a number of the actions in the subset that is at most an available number of the limited resource.

12. The processor-implemented method of claim 1, wherein the inputting of the constraint-specification includes:
    inputting a constraint specifying a dependency between from a first one of the modules to a second one of the modules; and
    determining the at least one dependent pair that is all pairs of one of the actions within the hierarchical tree structure of the first module and one of the actions within the hierarchical tree structure of the second module.

13. The processor-implemented method of claim 1, wherein the outputting of the cluster-specification comprises creating in a memory of a computing system a list of each cluster of the root and the actions included in each cluster of the root.

14. A non-transitory program storage medium, comprising:
- a processor-readable device configured with instructions for generating a plurality of clusters of a plurality of actions for manipulating a plurality of packets of a communication protocol, wherein execution of the instructions by one or more processors causes the one or more processors to perform operations including:
- inputting a declarative description of a processor of the packets of the communication protocol, the declarative description specifying a hierarchical tree structure including a plurality of modules, the modules including a plurality of respective leaf modules for the actions for manipulating the packets of the communication protocol and a plurality of instance modules;
- wherein one of the instance modules is a root of the hierarchical tree structure and each of the respective leaf and instance modules other than the root is a child of one of the instance modules;
- inputting a constraint-specification of at least one dependent pair of the actions;
- for each respective leaf module generating a cluster that includes the action of the respective leaf module;
- for each instance module generating at least one cluster that collectively includes the actions in each cluster of each child of the instance module;
- wherein for each cluster of each child of the instance module, the actions in the cluster are included in a same one of the at least one cluster, and each dependent pair of the actions are not included in a same one of the at least one cluster; and
- outputting a cluster-specification of the at least one cluster of the root.

15. The non-transitory program storage medium of claim 14, wherein the generating of each cluster of each instance and respective leaf module includes performing a traversal of the hierarchical tree structure, upon visiting each respective leaf module the traversal generating the cluster that includes the action of the respective leaf module, and upon visiting each instance module the traversal generating the at least one cluster of the instance module.

16. The non-transitory program storage medium of claim 15, wherein the generating of the at least one cluster upon visiting each instance module includes merging the clusters of each child of the instance module.

17. The non-transitory program storage medium of claim 16, wherein:
- the merging of the clusters of each child of the instance module includes partitioning the clusters of every child of the instance module into at least one group; and
- for each group, generating a respective one of the at least one cluster including each action of each cluster in the group.

18. The non-transitory program storage medium of claim 17, wherein for each of the at least one dependent pair of the actions, the dependent pair of the actions are not included in the clusters of a same one of the at least one group.

19. The non-transitory The program storage medium of claim 14, wherein the at least one cluster of the root comprises a plurality of clusters collectively including the actions for manipulating the packets of the communication protocol.

20. The non-transitory program storage medium of claim 19, wherein the inputting of the constraint-specification includes inputting a constraint specifying a subset of the actions that require a limited resource, and each cluster of the root includes a number of the actions in the subset that is at most an available number of the limited resource.

* * * * *